US011407622B2

(12) United States Patent
Garrec

(10) Patent No.: US 11,407,622 B2
(45) Date of Patent: Aug. 9, 2022

(54) ANTI-ROTATION WITH CABLES

(71) Applicant: COMMISSARIAT A L'ENERGIE ATOMIQUE ET AUX ENERGIES ALTERNATIVES, Paris (FR)

(72) Inventor: Philippe Garrec, Gif-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 214 days.

(21) Appl. No.: 16/636,453

(22) PCT Filed: Jul. 19, 2018

(86) PCT No.: PCT/EP2018/069691
§ 371 (c)(1),
(2) Date: Feb. 4, 2020

(87) PCT Pub. No.: WO2019/029976
PCT Pub. Date: Feb. 14, 2019

(65) Prior Publication Data
US 2020/0172383 A1  Jun. 4, 2020

(30) Foreign Application Priority Data
Aug. 9, 2017 (FR) ...................................... 1757618

(51) Int. Cl.
*F16H 25/20* (2006.01)
*B66F 3/08* (2006.01)
(Continued)

(52) U.S. Cl.
CPC ............... *B66F 3/08* (2013.01); *F16H 19/06* (2013.01); *F16H 25/20* (2013.01);
(Continued)

(58) Field of Classification Search
CPC ...... F16H 19/06; F16H 25/20; F16H 25/2204; F16H 19/0672; F16H 2019/0686; F16H 2025/2075; B66F 3/08
See application file for complete search history.

(56) References Cited

U.S. PATENT DOCUMENTS

2010/0275710 A1* 11/2010 Wingett .................. F16H 25/20
74/424.82
2012/0260755 A1* 10/2012 Asher ................. F16H 57/0497
74/89.32
(Continued)

FOREIGN PATENT DOCUMENTS

| FR | 103 13 739 A1 | 10/2003 |
| FR | 3 018 327 A1 | 9/2015 |
| WO | 2014/128178 A1 | 8/2014 |

OTHER PUBLICATIONS

International Search Report of PCT/EP2018/069691 dated Nov. 6, 2018.

*Primary Examiner* — David M Fenstermacher
(74) *Attorney, Agent, or Firm* — Sughrue Mion, PLLC

(57) ABSTRACT

A cable cylinder (100) comprising a frame (1);—a pin (2) mounted on the frame and extending along a first axis (Oy);—a nut (4) engaging with the pin (2);—a first cable (10) coupled to the nut or the pin (2) and intended to be functionally connected to an element to be moved;—a motor (3) designed to rotate the pin (2) or the nut (4); characterised in that the first cable (6) comprises at least a first section (6.1) extending substantially parallel to the first axis (Ox), and the first cable (6) is designed to exert opposing forces on rotation of the nut (4) by the pin (2) or of the pin (2) by the nut (4) in order to constitute anti-rotation means so that a rotation of the pin (2) or of the bolt (4) under the action of the motor (3) causes a relative movement of the nut (4) and of the pin (2).

17 Claims, 8 Drawing Sheets

(51) Int. Cl.
    *F16H 19/06*    (2006.01)
    *F16H 25/22*    (2006.01)
(52) U.S. Cl.
    CPC ..... *F16H 25/2204* (2013.01); *F16H 19/0672* (2013.01); *F16H 2019/0686* (2013.01); *F16H 2025/2075* (2013.01)

(56) References Cited

U.S. PATENT DOCUMENTS

| | | | |
|---|---|---|---|
| 2015/0059503 A1* | 3/2015 | Baric | B23Q 1/035 74/89.32 |
| 2015/0345600 A1 | 12/2015 | Garrec et al. | |
| 2017/0009857 A1* | 1/2017 | Garrec | F16H 19/06 |
| 2017/0307054 A1* | 10/2017 | Rousseau | F16K 31/50 |
| 2020/0172383 A1* | 6/2020 | Garrec | F16H 19/0622 |
| 2021/0262876 A1* | 8/2021 | Garrec | G01S 17/88 |

\* cited by examiner

ANTI-ROTATION WITH CABLES

CROSS REFERENCE TO RELATED APPLICATIONS

This application is a National Stage of International Application No. PCT/EP2018/069691 filed Jul. 19, 2018, claiming priority based on French Patent Application No. 17 57618 filed Aug. 9, 2017.

FIELD OF THE INVENTION

The invention relates to a cable jack comprising a screw/nut assembly of which the nut is able to move in translation and is coupled by a cable to an element that is to be moved.

BACKGROUND OF THE INVENTION

Cable jacks comprising a screw mounted on a chassis and a nut collaborating with the screw are known. The nut is associated with anti-rotation means so that a relative rotation of the screw and of the nut causes an axial movement of the nut.

The known anti-rotation means generally comprise a roller or a stud securely attached to the nut and mounted with the ability to slide in a slot of a chassis. Such anti-rotation devices require very accurate machining and fit, particularly when the travel is great. In addition, rigorous maintenance is required in order to maintain satisfactory jack performance, particularly in the case of jacks operating in difficult (dusty, moist) environments.

Thus, the more widespread use of cable jacks is being slowed by high manufacturing and maintenance costs.

OBJECT OF THE INVENTION

The object of the invention is to reduce the costs of manufacturing and/or of maintaining a cable jack.

SUMMARY OF THE INVENTION

To this end, there is provided a jack comprising a chassis, a screw mounted on the chassis and extending along a first axis, a nut collaborating with the screw, and a first cable coupled to the nut and intended to be functionally connected to an element that is to be moved. The jack also comprises a motor designed to drive the rotation of the screw or the nut. According to the invention, the first cable comprises at least a first portion extending substantially parallel to the first axis, and the first cable is designed to apply forces that oppose a rotational driving of the nut by the screw so as to constitute anti-rotation means so that a rotation of the screw or of the nut under the action of the motor gives rise to a relative movement of the nut and of the screw.

Thus there is obtained a jack that has no anti-rotation means other than the first cable connected to the nut. The costs of producing and maintaining such a jack are reduced, making this technology more accessible.

The torsional stiffness of the connection between the nut and the element that is to be moved is increased when the jack comprises a second cable coupled to the nut or to the screw and which is designed to exert forces opposing a rotational driving of the nut by the screw to constitute anti-rotation means so that a rotation of the screw or of the nut under the action of the motor gives rise to a relative movement of the nut and of the screw. The transverse resultant of the forces applied by the nut to the screw, and therefore the friction, are reduced when one portion of the first cable and one portion of the second cable extend one on each side of the first axis.

The jack can act on a load in two opposing directions of lifting/traction when the first cable and/or the second cable is coupled to the nut or to the screw so as to exert forces opposing a rotation of the nut with respect to the screw in both directions of relative movement of the nut and of the screw.

Advantageously, the jack comprises a third cable coupled to the nut and which is functionally connected to the element that is to be moved.

The torsional stiffness of the connection between the nut and the element that is to be moved is further increased when the jack comprises a fourth cable coupled to the nut or to the screw and which is functionally connected to the element that is to be moved. According to one preferred embodiment, a portion of the third cable and a portion of the fourth cable extend one on each side of the first axis. It is particularly advantageous for the portions of the third cable and of the fourth cable to extend one on each side of the first axis Ox in a plane extending substantially orthogonally to a plane containing the first portion of the first cable and the second portion of the second cable.

Advantageously also, the first and/or the second cable extend between the nut and a first intermediate support and the third cable has a first end connected to the first intermediate support and a second end intended to be functionally connected to the element that is to be moved.

According to one preferred embodiment, the fourth cable has a first end connected to the first intermediate support and a second end intended to be functionally connected to the element that is to be moved.

A fifth cable may be coupled to the nut or to the screw and be functionally connected to the element that is to be moved.

A sixth cable may be coupled to the nut or to the screw and be functionally connected to the element that is to be moved.

The transverse resultant of the forces applied by the nut to the screw, and therefore the friction, are reduced when one portion of the fifth cable and one portion of the sixth cable extend one on each side of the first axis.

As a preference, the first and the second cable also extend between the nut and a second intermediate support and the fifth cable is connected to the second intermediate support.

The stiffness of the jack is improved when any one of the cables is preloaded. The internal lash is notably reduced when the screw is a ball screw.

Further features and advantages of the invention will become apparent from reading the following description of nonlimiting particular embodiments of the invention.

BRIEF DESCRIPTION OF THE DRAWINGS

Reference will be made to the appended drawings, among which.

DETAILED DESCRIPTION OF THE INVENTION

Figure 1:
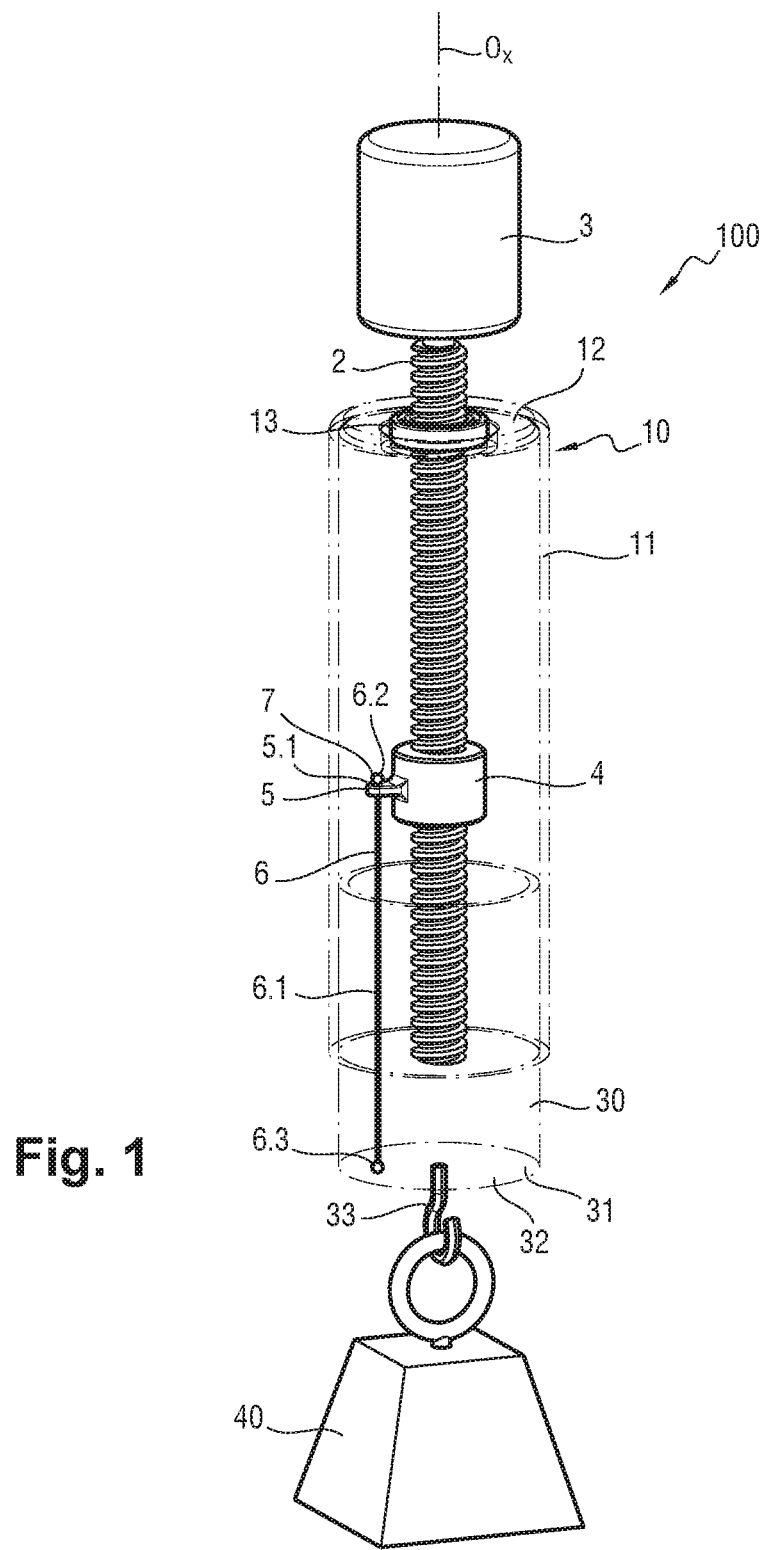
FIG. 1 is a perspective view of a jack according to a first embodiment of the invention.

With reference to FIG. 1, the jack of the invention, denoted 100 overall, comprises a chassis 10, in this instance a portion of a right cylinder 11 comprising a base 12 at the center of which a bearing 13 accepts a screw 2 to rotate about a vertical first axis Ox. The screw 2 is a ball screw and is driven in rotation by an electric motor 3. A nut 4 collaborates with the screw 2 and comprises a first eye 5 projecting radially from the nut 4. A first cable 6 extends parallel to the first axis Ox and comprises a first portion 6.1 held at its first end 6.2 in the first eye 5 by a first crimping 7 bearing against a first face 5.1 of the first eye 5. The second end 6.3 of the cable 6 is connected to a tube 30 mounted inside the cylinder 11 to form a sliding connection according to arrangements known to those skilled in the art and not depicted. The tube 30 at its end 31 comprises a transverse face 32 provided with a hook 33 to which a load 40 that is to be moved is connected.

Under the effect of the motor 3, a rotation of the screw 2 causes an identical rotation of the nut 4 because of the friction in the contact between the screw 2 and the nut 4. This movement tensions the first cable 6 which then begins to exert forces that oppose a rotational driving of the nut 4 by the screw 2. The first cable 6 then performs—in addition to its function of transmitting the forces of movement to the load 40—an anti-rotation function so that a rotation of the screw 2 under the action of the motor 3 causes the nut 4 to move relative to the screw 2. Thus, the nut 4 moves axially under the effect of the rotation of the screw 2, without rotating about the first axis Ox. However, minimal angular deflections of the nut about two axes Oy and Oz, which are mutually orthogonal and contained in a plane normal to the first axis Ox, are permitted. This renders the jack of the invention tolerant to oscillations of the nut with respect to the screw according to a phenomenon known to those skilled in the art and common to screws equipped with rolling elements (rollers or balls).

What is thus obtained is a lifting jack 100 that has no anti-rotation means other than the first cable 6 connected to the nut 4. The costs of producing and maintaining such a jack are reduced, making this technology more accessible.

Elements that are identical or analogous to those previously described will bear a numerical reference identical to the latter in the following description of the seven embodiments of the invention.

Figure 2:
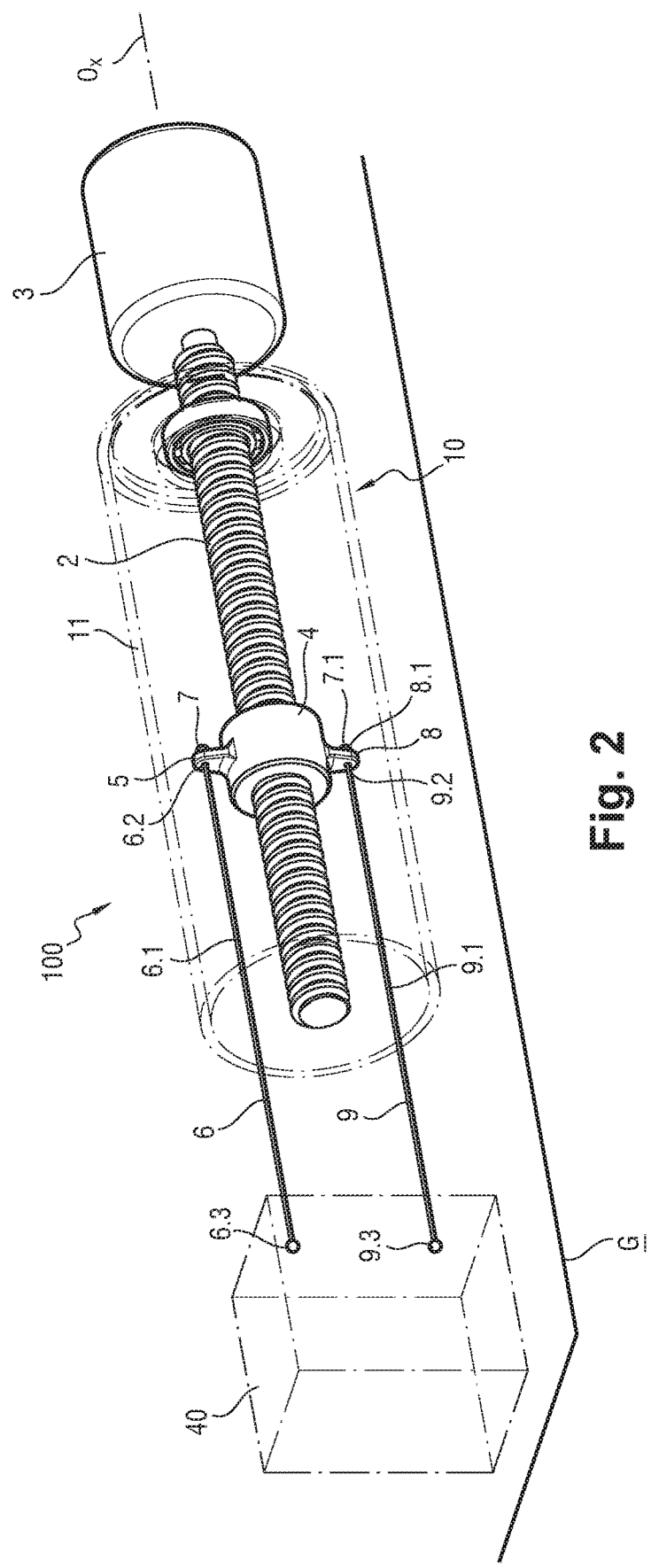
FIG. 2 is a perspective view of a jack according to a second embodiment of the invention.

According to a second embodiment of the invention depicted in FIG. 2, the screw 2 extends along a first axis Ox that is horizontal and the nut 4 comprises a second eye 8 projecting radially from the nut 4 in such a way as to be diametrically opposite the first eye 5. A second cable 9 extending parallel to the first axis Ox and comprises a first portion 9.1 held at its first end 9.1 in the second eye 8 by a second crimping 7.1 coming to bear against a first face 8.1 of the second eye 8. The second end 9.3 of the second cable 9 and the second end 6.3 of the first cable 6 are connected to a load 40 that is to be moved, resting on the ground G. The first portion 6.1 of first cable 6 and the first portion 9.1 of second cable 9 thus extend one on each side of the first axis Ox.

Under the effect of the motor 3, a rotation of the screw 2 gives rise to an identical rotation of the nut 4 because of the friction in the contact between the screw 2 and the nut 4. This movement places the first cable 6 and the second cable 9 under tension and these therefore exert forces that oppose a rotational driving of the nut 4 by the screw 2. The first cable 6 and the second cable 9 therefore perform—in addition to their function of transmitting the forces of movement to the load 40—an anti-rotation function so that a rotation of the screw 2 under the action of the motor 3 gives rise to a movement of the nut 4 relative to the screw 2. Thus, the nut 4 moves axially under the effect of the rotation of the screw 2, without rotating about the first axis Ox.

This then yields a side-shifting jack 100, with no anti-rotation means other than the first cable 6 and the second cable 9 which are connected to the nut 4.

Figure 3:
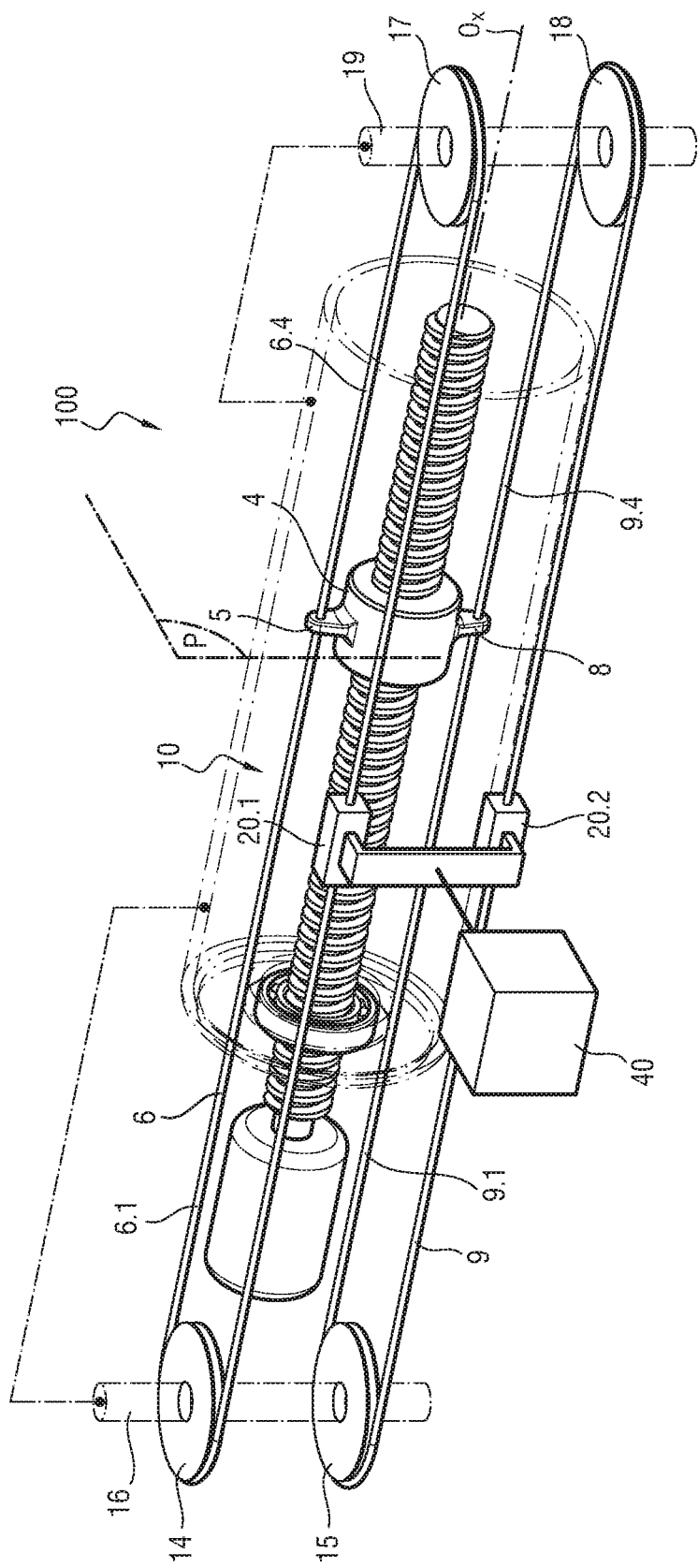
FIG. 3 is a perspective view of a jack according to a third embodiment of the invention.

According to a third embodiment depicted in FIG. 3, the first cable 6 is crimped to the first eye 5 and passes through the latter in order to have a first portion 6.1 and a second portion 6.4 extending parallel to the first axis Ox one on each side of a plane P orthogonal to the first axis Ox containing the first eye 5. Analogously, the second cable 9 is crimped to the second eye 8 and passes through this eye to have a first potion 9.1 and a second portion 9.4 extending parallel to the first axis Ox one on each side of the plane P which also contains the second eye 8. The first portion 6.1 and the first portion 9.1 are respectively wound around a first pulley 14 and around a second pulley 15, the first pulley 14 and the second pulley 15 being firmly attached to a first shaft 16 connected to the chassis 10 and mounted with the ability to rotate about an axis perpendicular to the first axis Ox. The second portion 6.4 and the second portion 9.4 are respectively wound around a third pulley 17 and around a fourth pulley 18, the third pulley 17 and the fourth pulley 18 being firmly attached to a second shaft 19 connected to the chassis 10 and mounted to rotate about an axis perpendicular to the first axis Ox. The first portion 6.1 and the second portion 6.4 of the first cable 6 meet after leaving the first pulley 14 and the third pulley 16, at a third crimping 20.1. The first portion 9.1 and the second portion 9.4 of the second cable 9 meet after leaving the second pulley 15 and the fourth pulley 19, at a fourth crimping 20.2. The third and fourth crimpings 20.1 and 20.2 are connected to a load 40 that is to be moved. The cables 6 and 9 are preloaded, for example by altering the distance separating the first shaft 16 and the second shaft 19.

Because the first cable 6 and the second cable 9 are taut, they apply forces that oppose a rotational driving of the nut 4 by the screw 2 when the motor 3 turns in both directions of movement of the nut 4 relative to the screw 2. They therefore perform—in addition to their function of transmitting forces of movement to the load 40—an anti-rotation function so that a rotation of the screw 2 under the action of the motor 3 gives rise to a movement of the nut 4 relative to the screw 2. The cable jack 100 according to the third embodiment of the invention allows the load 40 to be moved in two opposite directions.

This then yields a cable jack 100 which has no anti-rotation means other than the first and second cables 6 and 9 connected to the nut 4.

Figure 4:
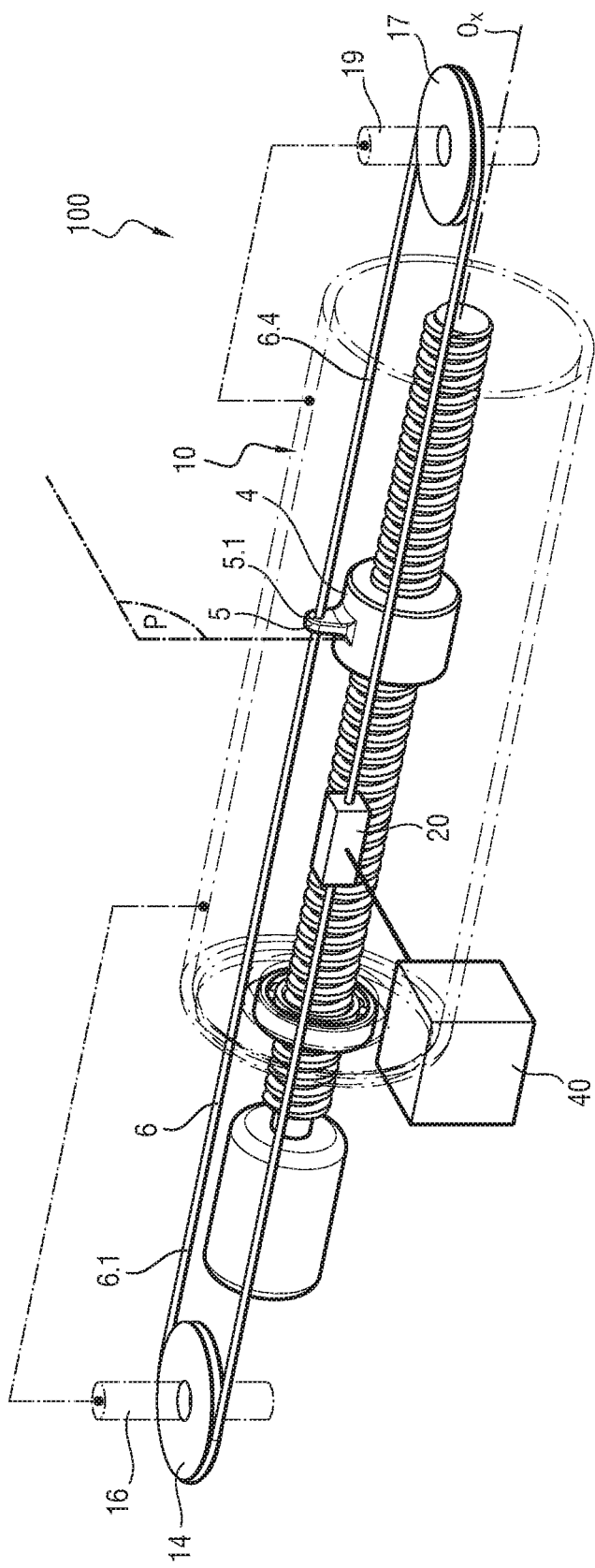
FIG. 4 is a perspective view of a jack according to a fourth embodiment of the invention.

The fourth embodiment depicted in FIG. 4 is a variation on the third embodiment of the invention in which just the first cable 6 opposes a rotation of the nut 4 with respect to the screw 2 in the two directions of travel of the nut 4 with respect to the screw 2.

Figure 5:
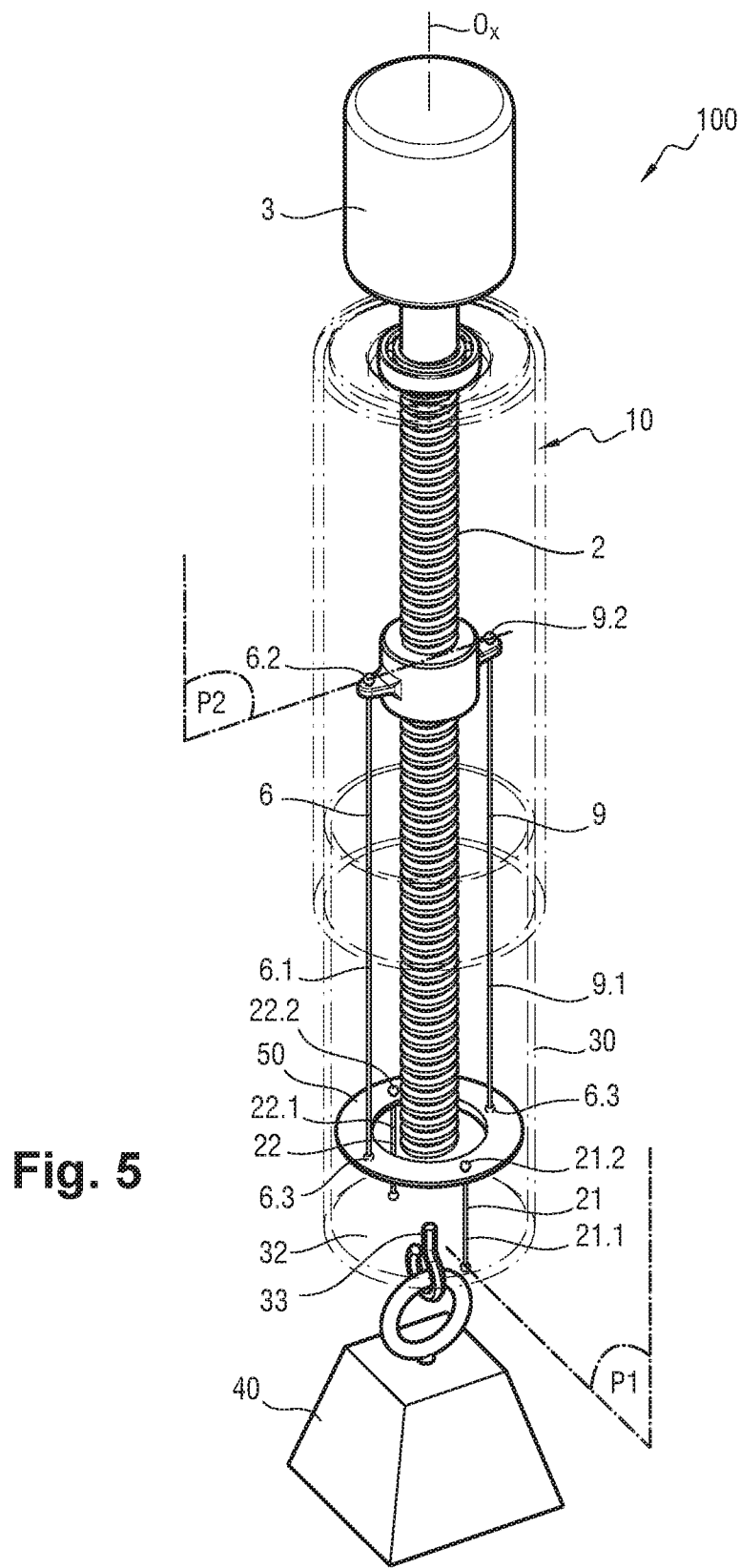
FIG. 5 is a perspective view of a jack according to a fifth embodiment of the invention.

According to a fifth embodiment depicted in FIG. 5, the screw 2 extends along a first axis Ox that is vertical. The cable jack 100 comprises a first portion 21.1 of a third cable 21 and a first portion 22.1 of a fourth cable 22 which extend parallel to the first axis Ox between an annular first intermediate support 50 and the transverse face 32 of the tube 30. The first intermediate support 50 is connected to the nut 4 by the first and second cables 6 and 9. The first portion 21.1 and the first portion 22.1 extend one on each side of the first axis Ox in a plane P1 containing the first axis Ox. The plane P1 extends substantially orthogonally to a plane P2 containing the first portion 6.1 of the first cable 6 and the second portion 9.1 of the second cable 9. The third cable 21 and the fourth cable 22 respectively have a first end 21.2 and 22.2 which are each connected to the first intermediate support 50: the third cable 21 and the fourth cable 22 are thus coupled to the nut 4. The third cable 21 and the fourth cable 22 are also functionally connected to the element 40 that is to be moved via the transverse face 32 of the tube 30.

Under the effect of the motor 3, a rotation of the screw 2 gives rise to an identical rotation of the nut 4 because of the friction in the contact between the screw 2 and the nut 4. This movement tensions the first cable 6 and the second cable 9 as well as the third cable 21 and the fourth cable 22. The first cable 6 and the second cable 9 apply forces that oppose a driving of the nut 4 in rotation by the screw 2 and these forces are transmitted to the third cable 21 and to the fourth cable 22. The cables 6, 9, 21, 22 therefore perform—in addition to their functions of transmitting the forces of movement to the load 40—an anti-rotation function so that a rotation of the screw 2 under the action of the motor 3 gives rise to a movement of the nut 4 relative to the screw 2. Thus, the screw 4 moves axially under the effect of the rotation of the screw 2, without rotating about the first axis Ox.

This then yields a lifting jack 100 having no anti-rotation means other than the cables 6, 9, 21, 22 connected to the nut 4.

Figure 6:
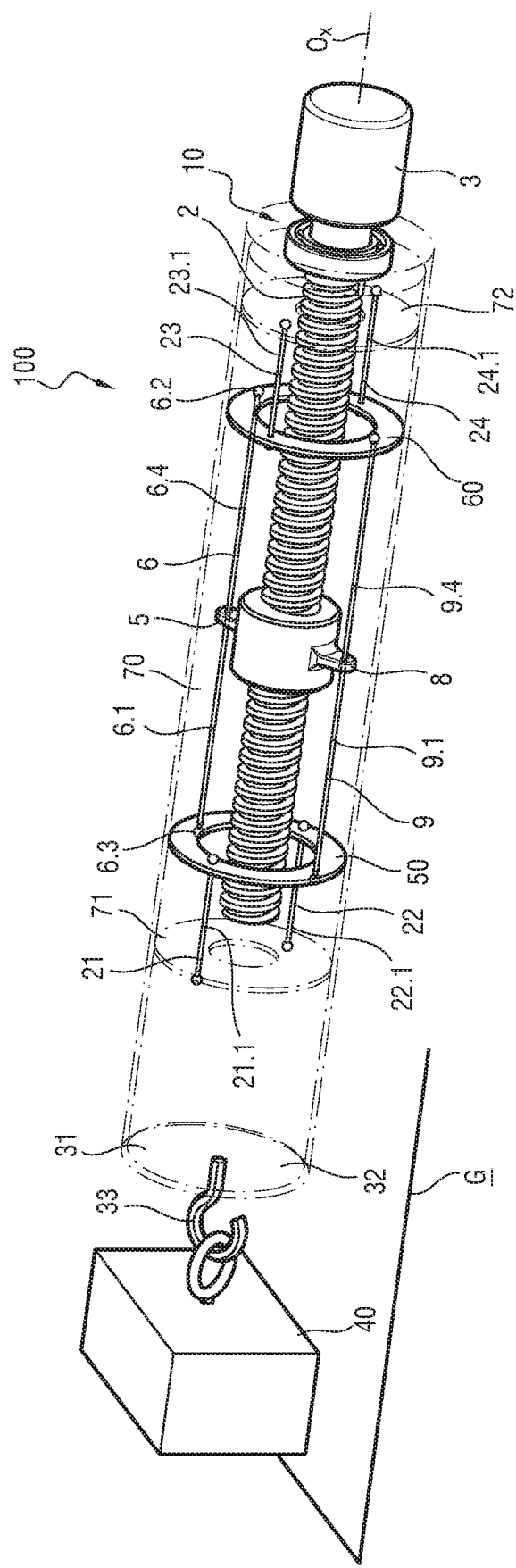
FIGS. 6 and 7 are perspective views of a jack according to a sixth embodiment of the invention.
Figure 7:
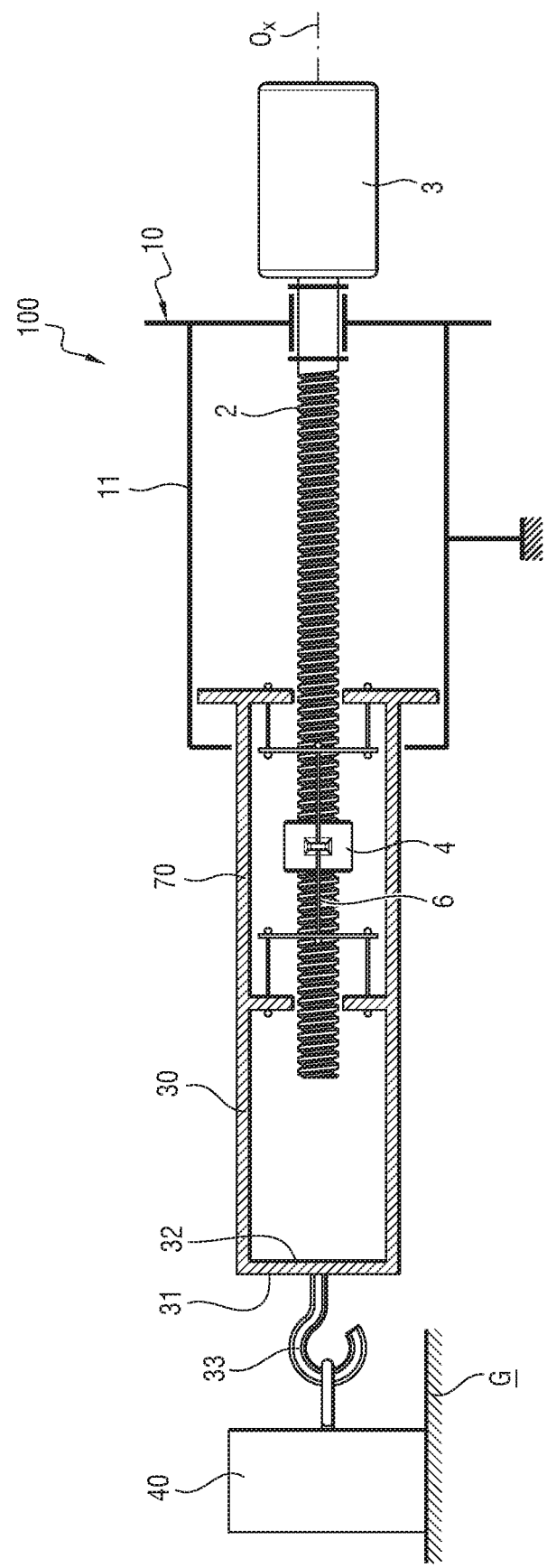

According to a sixth embodiment depicted in FIGS. 6 and 7, the first cable 6 is crimped to the first eye 5 and passes through the latter to have a first portion 6.1 and a second portion 6.4 extending parallel to the first axis Ox one on each side of a plane P orthogonal to the first axis Ox containing the first eye 5. Analogously, the second cable 9 is crimped to the second eye 8 and passes through the latter to have a first portion 9.1 and a second portion 9.4 extending parallel to the first axis Ox one on each side of a plane P orthogonal to the first axis Ox containing the second eye 8. The second end 6.3 of the first portion 6.1 is connected to the first intermediate support 50 and the first end 6.2 is connected to a second intermediate support 60. The first portion 21.1 of the third cable 21 and the first portion 22.1 of the fourth cable 22 extend parallel to the first axis Ox between the first intermediate support 50 and a first transverse face 71 of a first cylindrical cage 70 extending around the nut 4. The first portion 21.1 and the first portion 22.1 extend one on each side of the first axis Ox in a plane P1 containing the first axis Ox. The plane P1 extends substantially orthogonally to a plane P2 containing the first portion 6.1 and the second portion 9.1. Analogously, a first portion 23.1 of a fifth cable 23 and a first portion 24.1 of a sixth cable 24 extend parallel to the first axis Ox between the second intermediate support 60 and a second transverse face 72 of the first cage 70 which is the opposite face to the first transverse face 71. The first portion 23.1 and the first portion 24.1 extend one on each side of the first axis Ox in the plane P1. The first and second portions 6.1 and 6.4 of the first cable 6, the first and second portions 9.1 and 9.4 of the second cable 9, the first portion 21.1 of the third cable 21 and the first portion 22.1 of the fourth cable 22, as well as the first portion 23.1 of the fifth cable 23 and the first portion 24.1 of the sixth cable 24 are preloaded.

As can be seen in FIG. 7, the first cage 70 is firmly attached to the tube 30 mounted inside the cylinder 11 to form a sliding connection according to arrangements known to those skilled in the art and not depicted. The tube 30 at its end 31 comprises a transverse face 32 provided with a hook 33 to which a load 40 that is to be moved is connected.

The first cable 6 and the second cable 9 are taut—just like the cables 21, 22, 23 and 24—the first and second cables 6 and 9 as well as the cables 21, 22, 23 and 24 exert forces opposing a driving in rotation of the nut 4 by the screw 2 when the motor 3 rotates in the two directions of movement of the nut 4 relative to the screw 2. They therefore perform—in addition to their function of transmitting the forces of movement to the load 40—an anti-rotation function so that rotation of the screw 2 under the action of the motor 3 gives rise to a movement of the nut 4 relative to the screw 2. The nut 4 moves axially under the effect of the rotation of the screw 2, without rotating about the first axis Ox, and does so in both directions of rotation of the screw 2. The cable jack 100 according to the sixth embodiment of the invention allows the load 40 to be moved in two opposite directions.

This then yields a jack 100 having no anti-rotation means other than the first, second, third, fourth, fifth and sixth cables 6, 9, 21, 22, 23, 24 which are connected to the nut 4.

Figure 8:
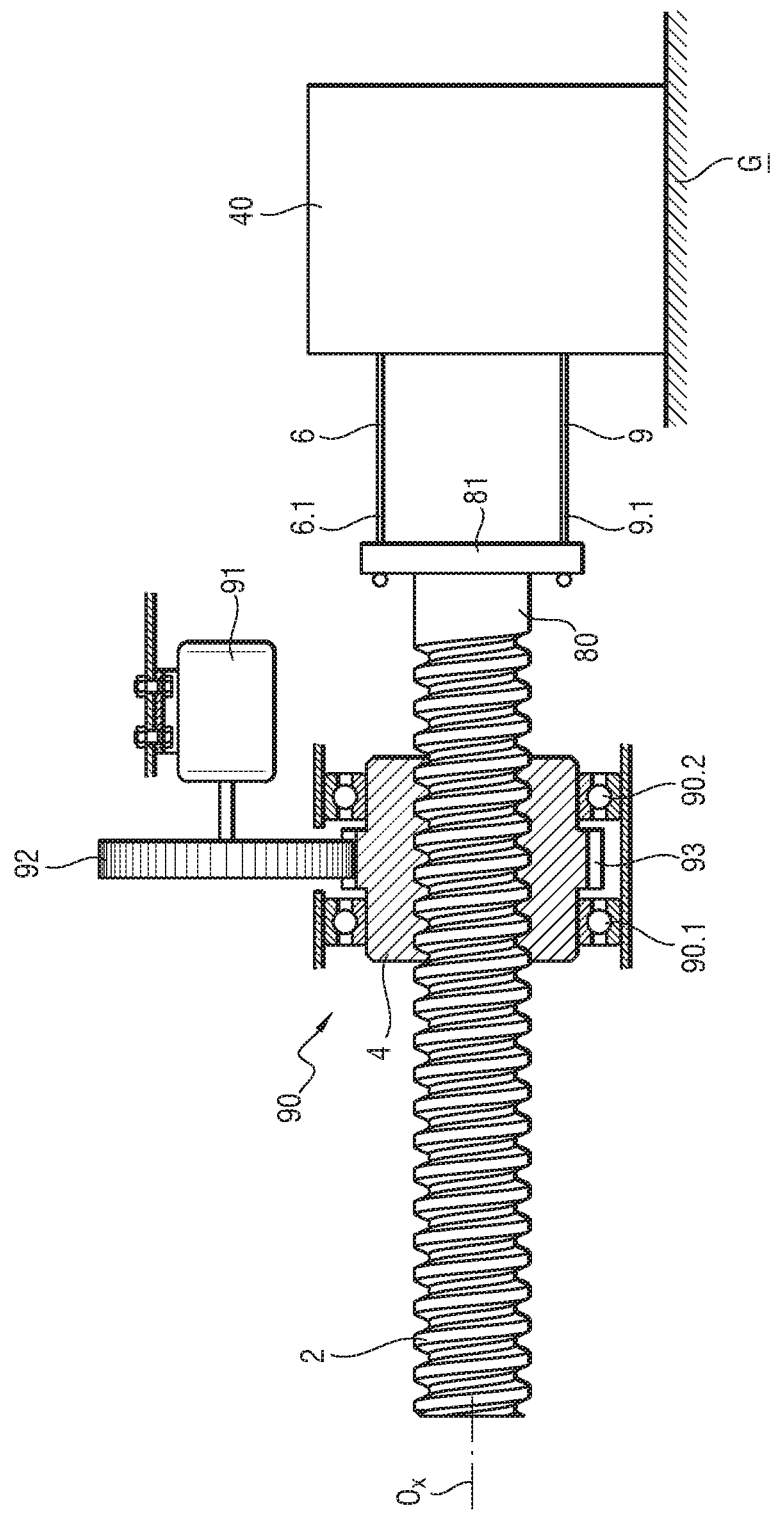
FIG. 8 is a perspective view of a jack according to a seventh embodiment of the invention.

According to a seventh embodiment depicted in FIG. 8, the nut 4 is mounted in a bearing 90 firmly attached to the chassis 10 and which comprises two ball bearing assemblies 90.1 and 90.2. A motor 91 firmly secured to the chassis 12 comprises a pinion 92 which meshes with an external tooth set 93 of the nut 4 to drive the latter in rotation. The screw 2 extends along a first axis Ox which is horizontal and has an end 80 firmly secured to a disk 81. A first cable 6 and a second cable 9 extend parallel to the axis Ox one on each side thereof. The first portion 6.1 of the first cable 6 extends from the disk 81 toward the load 40. A first portion 9.1 of the second cable 9 extends from the disk 81 toward the load 40.

Under the action of the motor 91, a rotation of the nut 4 causes an identical rotation of the screw 2 because of the friction in the contact between the screw 2 and the nut 4. This movement tensions the first cable 6 and the second cable 9 which then exert forces opposing a rotational driving of the screw 2 by the nut 4. The first cable 6 and the second cable 9 therefore perform—in addition to their function of transmitting forces of movement to the load 40—an anti-rotation function so that a rotation of the nut 4 under the action of the motor 3 gives rise to a movement of the screw 2 relative to the nut 4. Thus, the screw 2 moves axially under the effect of the rotation of the nut 4 without turning about the first axis Ox.

This then yields a side-shifting jack 100 having no anti-rotation means other than the first cable 6 and the second cable 9 which are connected to the screw 2.

Of course, the invention is not restricted to what has just been described but encompasses any variation that falls within the scope of the invention defined by the claims.

In particular,
  although here the chassis is cylindrical in shape, the invention also applies to other shapes of chassis such as, for example, a plate, a square tube, any arbitrary shape;
  although here the axis of rotation of the screw extends horizontally or vertically, the invention applies equally to other orientations of the axis of rotation of the screw such as, for example, an orientation at forty-five degrees or any;

although here the jack comprises a ball screw, the invention applies equally to other types of screw such as, for example, a screw with simple screw threads or a roller screw;

although here the first cable is coupled to the nut by crimping to an eye firmly attached to the nut, the invention equally applies to other means of coupling a cable to the nut such as, for example, a ring welded to the nut, crimping into a drilling made in the nut, round-turns through a drilling, attachment to an intermediate support;

although here the cables extend parallel to the first axis, the invention equally applies to other configurations of the cables in which configurations just a portion of the cables extends parallel to the first axis, the rest of the cable being able to adopt any arbitrary orientation with respect to the first axis;

although the first and second pulleys are firmly attached to the one same shaft, the invention equally applies to pulleys mounted on independent shafts;

although here the third, fourth, fifth and sixth cables are coupled to the nut by an intermediate support, the invention equally applies to third, fourth, fifth and sixth cables coupled directly to the nut;

although here all of the cables of the jack are preloaded, the invention equally applies to a single preloaded cable or to just a fraction of the cables preloaded;

although here the nut is mounted in a bearing which comprises two ball bearing assemblies, the invention equally applies to other means of mounting the nut on the chassis with the ability to rotate, such as, for example, a bronze bushing, a single tapered roller or needle bearing.

The forces exerted by the first cable and, where applicable, the second cable, to oppose rotation of the nut with respect to the screw may be reacted by the load, the chassis, an element connected to the chassis or any other means. In certain circumstances, the low nature of the friction in the contact between the nut and the screw by comparison with the tension exerted on the cable by the load or the like is enough to drive a translational movement of the nut without the need to provide a way of reacting the anti-rotation forces exerted by the cables.

The first, second, third, fourth, fifth and sixth embodiments of the invention as described in the context of a screw driven in rotation and moving a nut can be transposed to the instance of a nut driven in rotation and moving a screw as described in the seventh embodiment of the invention.

The invention claimed is:

1. A cable jack comprising:
a chassis;
a screw mounted on the chassis and extending along a first axis;
a nut collaborating with the screw;
a first cable secured to the nut so that at least first portion of the first cable moves along an axial direction of the screw as the screw rotates, the first cable further configured to be operatively connected to an element that is to be moved so as to move with the element;
a motor designed to drive the rotation of the screw or the nut;
wherein
the at least a first portion of the first cable extends substantially parallel to the first axis, and
the first cable is designed to apply forces that oppose a rotational driving of the nut by the screw so as to constitute anti-rotation means so that a rotation of the screw under the action of the motor gives rise to a relative movement of the nut and of the screw.

2. The jack as claimed in claim 1, wherein any one of the cables is preloaded.

3. The jack as claimed in claim 1, wherein the first cable and/or the second cable is coupled to the nut so as to exert forces opposing a rotational driving of the nut by the screw in both directions of relative movement of the nut and of the screw.

4. The jack as claimed in claim 1, in which the screw is a ball screw.

5. A cable jack comprising:
a chassis;
a screw mounted on the chassis and extending along a first axis;
a nut collaborating with the screw;
a first cable coupled to the nut or to the screw and configured to be functionally connected to an element that is to be moved;
a motor designed to drive the rotation of the screw or the nut;
wherein:
the first cable comprises at least a first portion extending substantially parallel to the first axis, and
the first cable is designed to apply forces that oppose a rotational driving of the nut by the screw or of the screw by the nut so as to constitute anti-rotation means so that a rotation of the screw or of the nut under the action of the motor gives rise to a relative movement of the nut and of the screw; and
the cable jack further comprising a third cable coupled to the nut or to the screw, the third cable being functionally connected to the element that is to be moved.

6. The jack as claimed in claim 5, comprising a fourth cable coupled to the nut or to the screw, the fourth cable being functionally connected to the element that is to be moved.

7. The jack as claimed in claim 6, wherein a portion of the third cable and a portion of the fourth cable extend one on each side of the first axis.

8. The jack as claimed in claim 5, wherein the first and/or the second cable extend between the nut or the screw and a first intermediate support and wherein the third cable has a first end connected to the first intermediate support and a second end intended to be functionally connected to the element that is to be moved.

9. The jack as claimed in claim 8, wherein the fourth cable has a first end connected to the first intermediate support and a second end intended to be functionally connected to the element that is to be moved.

10. The jack as claimed in claim 8, comprising a fifth cable coupled to the nut or to the screw, the fifth cable being functionally connected to the element that is to be moved.

11. The jack as claimed in claim 10, comprising a sixth cable coupled to the nut or the screw, the sixth cable being functionally connected to the element that is to be moved.

12. The jack as claimed in claim 11, wherein a portion of the fifth cable and a portion of the sixth cable extend one on each side of the first axis.

13. The jack as claimed in claim 10, wherein the first and the second cable also extend between the nut or the screw and a second intermediate support and wherein the fifth cable is connected to the second intermediate support.

14. The jack as claimed in claim 13, wherein the sixth cable is connected to the second intermediate support.

15. A cable jack comprising:
a chassis;
a screw mounted on the chassis and extending along a first axis;
a nut collaborating with the screw;
a first cable coupled to the nut or to the screw and configured to be functionally connected to an element that is to be moved;
a motor designed to drive the rotation of the screw or the nut;
wherein:
the first cable comprises at least a first portion extending substantially parallel to the first axis, and
the first cable is designed to apply forces that oppose a rotational driving of the nut by the screw or of the screw by the nut so as to constitute anti-rotation means so that a rotation of the screw or of the nut under the action of the motor gives rise to a relative movement of the nut and of the screw; and
the cable jack further comprising a second cable coupled to the nut or to the screw, the second cable being designed to exert forces opposing a rotational driving of the nut by the screw or of the screw by the nut to constitute anti-rotation means so that a rotation of the screw or of the nut under the action of the motor gives rise to a relative movement of the nut and of the screw.

16. The jack as claimed in claim 15, wherein a portion of the first cable and a portion of the second cable extend one on each side of the first axis.

17. A cable jack comprising:
a chassis;
a screw mounted on the chassis and extending along a first axis;
a nut operatively connected to the screw;
a first cable secured to the screw so that the screw moves along the first axis as the nut rotates, the first cable further configured to be operatively connected to an element that is to be moved so as to move with the element;
a motor designed to drive the rotation of the nut;
wherein
the first cable is configured to apply forces that oppose a rotational driving of the screw by the nut so as to constitute anti-rotation means so that a rotation of the nut under the action of the motor gives rise to a relative movement of the nut and the screw.

* * * * *